(12) United States Patent
O'Krongly

(10) Patent No.: US 12,439,905 B1
(45) Date of Patent: Oct. 14, 2025

(54) HOOK KEEPER HAVING A ROTATABLE HOOKING PAD FOR USE WITH A FISHING DEVICE

(71) Applicant: Jeffrey A. O'Krongly, Mercer, WI (US)

(72) Inventor: Jeffrey A. O'Krongly, Mercer, WI (US)

( * ) Notice: Subject to any disclaimer, the term of this patent is extended or adjusted under 35 U.S.C. 154(b) by 0 days.

(21) Appl. No.: 18/780,101

(22) Filed: Jul. 22, 2024

(51) Int. Cl.
*A01K 87/00* (2006.01)
*A01K 97/12* (2006.01)

(52) U.S. Cl.
CPC ............ *A01K 97/12* (2013.01); *A01K 87/009* (2022.02)

(58) Field of Classification Search
CPC ......... A01K 87/04; A01K 87/09; A01K 97/12
See application file for complete search history.

(56) References Cited

U.S. PATENT DOCUMENTS

| | | | | |
|---|---|---|---|---|
| 2,483,537 | A * | 10/1949 | Girard | A01K 87/04 57/1 R |
| 2,654,176 | A | 10/1953 | Kachelski et al. | |
| 3,058,249 | A | 10/1962 | Krusbe | |
| 3,950,880 | A * | 4/1976 | Polaszek | A01K 97/12 43/17 |
| 7,669,360 | B2 | 3/2010 | Davidson | |
| 8,978,288 | B2 | 3/2015 | Olson et al. | |
| 9,392,783 | B1 * | 7/2016 | Harvey | A01K 97/12 |
| 9,504,239 | B2 | 11/2016 | Stender | |
| 11,344,013 | B1 * | 5/2022 | Kamai, III | A01K 87/06 |
| 11,832,602 | B1 | 12/2023 | Fetty | |
| 2008/0244956 | A1 | 10/2008 | Gant et al. | |
| 2016/0057985 | A1 * | 3/2016 | Farrington | A01K 99/00 43/4.5 |
| 2020/0253178 | A1 * | 8/2020 | Bassett | A01K 87/04 |
| 2022/0354100 | A1 * | 11/2022 | Morgan | A01K 87/009 |
| 2023/0309523 | A1 * | 10/2023 | Smith | A01K 95/00 43/25.2 |

FOREIGN PATENT DOCUMENTS

JP 6190328 B2 8/2017

* cited by examiner

*Primary Examiner* — Richard G Davis
(74) *Attorney, Agent, or Firm* — The Patent Company, LLC; Marc D. Thompson

(57) ABSTRACT

The present invention pertains to a hook keeper for quickly securing a hook attached to a fishing line of a fishing device for protecting the hook itself and nearby objects during storage or transport. The hook keeper includes a rotating hooking pad, a retaining cap, an anchor sleeve with an internal compression plug, and a binding wrap for fastening the hook keeper to a line guide of a fishing device. The binding wrap passes through one or more slits in the retaining cap on opposite sides of the anchor sleeve forming a fastening loop to couple to the line guide. When tightened, the binding wrap secures the hook keeper to the line guide while allowing the hooking pad to rotate clear of a hole in the line guide.

20 Claims, 8 Drawing Sheets

HOOK KEEPER HAVING A ROTATABLE HOOKING PAD FOR USE WITH A FISHING DEVICE

FIELD OF THE INVENTION

The present invention pertains to a hook keeper that engages with a fishing hook attached to a line of a fishing device and quickly provides securing of the fishing hook hindering the fishing hook from engaging other objects proximal to the fishing device.

BACKGROUND OF THE INVENTION

Various and numerous fishing devices have been developed since the dawn of human existence. Typically, a line, wire, or other reasonably strong strand of material is secured to a fishing device and one or more hooks are attached to the opposite end of the line. After bait is attached to a fishing hook, the fishing hook is lowered into water in an attempt to attract and catch fish that interact with the fishing hook. Fishing hooks generally employ a shank, a bend, a point, and barb located near the distal end of a thin and curved rigid metal member. Once a fishing hook engages with an object, a fishing hook is designed to remain engaged. As a result, fishing hooks can inconveniently become attached to objects that come into contact with the fishing device, particularly when the fishing device is not in use or is being transported. Any exposed fishing hooks points and barbs are undesirable and potentially unsafe making engagement situations problematic, damaging, and even dangerous.

Likewise, when fishing devices are stored or transported, fishing hooks may engage with objects during storage or transport of the fishing device causing damage to the fishing device, the hooks, other proximal objects, or all of the above.

There is a need in the art to better secure fishing hooks of fishing devices such that the fishing hooks points and barbs are not exposed to engage with other objects during storage or transit of the fishing device. This enables fishing devices to be handled, stored, and transported safely and without object or fishing device damage. Further, ease of use of a hook keeper for quickly securing a fishing hook is important so that a minimal amount of time is required to secure the fishing hook so that the fishing device may be rapidly readied for safe storage or transport.

The current invention addresses many of these problems by safely isolating a pointed and barbed portion of a fishing hook from objects proximal to the fishing device during storage and transport.

SUMMARY OF THE INVENTION

An object of the present disclosure is to provide a hook keeper that attaches to a fishing device and rotates to provide a hooking pad that quickly and securely isolates a fishing hook attached to a fishing line of the fishing device, protecting and isolating dangerous parts of the fishing hook from interacting with objects proximal to the fishing device during storing or transport.

In accordance with one embodiment of the disclosure, a hook keeper for securing a hook attached to a fishing line passing through a line guide of a fishing device is disclosed, comprising a hooking pad, and a binding wrap for fastening the hook keeper to the line guide. The hooking pad is connected to the line guide and is configured to rotate into a first position allowing the fishing line to pass through a first aperture of the hooking pad unimpeded, and into a second position where the fishing line does not contact or pass through the hooking pad.

In accordance with one embodiment of the disclosure, the hook keeper further comprises a retaining cap having a first portion, a second portion, and at least one slot in the first portion, wherein the binding wrap passes through the at least one slot of the retaining cap and the second portion is positioned inside a second aperture of the hooking pad.

In accordance with one embodiment of the disclosure, the hook keeper further comprises an anchor sleeve positioned in the second portion of the retaining cap and a compression plug positioned inside the anchor sleeve.

In accordance with one embodiment of the disclosure, the binding wrap is positioned between the hooking pad and the anchor sleeve.

In accordance with one embodiment of the disclosure, the hooking pad rotates about the second portion of the retaining cap.

In accordance with one embodiment of the disclosure, the hooking pad includes a first surface facing the line guide in the first position, a second surface opposite the first surface, and a slit extending from the first surface to the second surface and from the first aperture to an outside lateral edge of the hooking pad.

In accordance with one embodiment of the disclosure, the retaining cap sits flush against the hooking pad.

In accordance with one embodiment of the disclosure, the hooking pad rotates in a plane parallel to a plane of a hole of the line guide.

In accordance with one embodiment of the disclosure, the hooking pad rotates perpendicular to a plane of a hole of the line guide.

In accordance with one embodiment of the disclosure, the fishing device is a tip up fishing device.

In accordance with one embodiment of the disclosure, a hook keeper for securing a hook attached to a fishing line passing through a line guide of a fishing device is disclosed, comprising a hooking pad, a retaining cap, and a binding wrap. The hooking pad has a first surface, a second surface, a first aperture, a second aperture, and a slit extending from the first surface to the second surface and from the second aperture to an outside lateral edge of the hooking pad. The retaining cap has a first portion positioned substantially flush with and against the first surface, at least one slot in the first portion, and a second portion positioned inside the first aperture. The binding wrap passes through the at least one slot of the retaining cap and secures the hook keeper to the line guide.

In accordance with one embodiment of the disclosure, an anchor sleeve is positioned in the second portion of the retaining cap and a compression plug is positioned inside the anchor sleeve, such that the binding wrap is positioned inside the second portion on opposite sides of the anchor sleeve and the retaining cap extends to at least the edge of the second surface of the hooking pad.

In accordance with one embodiment of the disclosure, the binding wrap compresses and deforms the anchor sleeve to secure the hook keeper to the line guide.

In accordance with one embodiment of the disclosure, the hooking pad rotates about the second portion of the retaining cap in a plane parallel to a hole of the line guide.

In accordance with one embodiment of the disclosure, the slit of the hooking pad expands to allow the fishing line of the fishing device to pass through the edge of the hooking pad and be positioned inside the second aperture of the hooking pad.

In accordance with one embodiment of the disclosure, the second aperture accommodates a shank of the hook attached to the fishing line of the fishing device and the hooking pad engages with at least one point of the hook when the fishing line is taut.

In accordance with one embodiment of the disclosure, the at least one point comprises a plurality of points engaging with the hooking pad.

In accordance with one embodiment of the disclosure, a method for installing and using a hook keeper in conjunction with a fishing device is disclosed, the method comprising the steps of placing the hook keeper against an installation region of a line guide of the fishing device, and tightening a binding wrap of the hook keeper to install and secure the hook keeper against the line guide at the installation region, such that a hooking pad of the hook keeper is configured to rotate to a first position and a second position. In the first position, the hooking pad is configured to surround a fishing line of the fishing device and engage at least one point of a hook attached the to hook when the fishing line is taut. In the second position, the hooking pad is configured such that the fishing line and hook are clear from interaction with the hook keeper.

In accordance with one embodiment of the disclosure, when the hook keeper is in the first position, the method further comprises aligning an aperture of the hooking pad with a hole of the line guide, positioning the fishing line of the fishing device inside an aperture of the hooking pad via a slit to surround the fishing line, and tautening the fishing line of the fishing device to draw a shank of the hook of the fishing device into the aperture of the hooking pad, and engage the at least one point of the hook with the hooking pad to immobilize the hook.

In accordance with one embodiment of the disclosure, when the hook keeper is in the first position, the method further comprises loosening the fishing line of the fishing device to disengage the at least one points of the hook from the hooking pad, removing the fishing line from the aperture of the hooking pad via the slit, and rotating the hooking pad into the second position.

Additional scope of the present application is provided within the following detailed description. However, it should be understood that the detailed description and specific examples, indicating exemplary embodiments of the invention and disclosure, are provided for illustration purposes only. Various changes and modifications that are within the spirit and scope of the invention and disclosure should be recognized to those skilled in the art in light of this detailed description.

The terminology provided herein is used to describe particular embodiments of the invention only, and is not intended to limit the scope of the present invention in any way whatsoever. As used herein, the term "and/or" includes any and all combinations of one or more of the associated listed items, and the singular terms "a," "an," and "the" are intended to include plural forms as well, unless the disclosure and/or context clearly dictates otherwise. Further, the terms "comprises," "comprising," "includes," and/or "including," when used in this specification, specify the presence of stated features, elements, components, and/or groups, but do not preclude the presence or addition of one or more other features, elements, components, and/or groups thereof. It is also noted that, as used herein, the terms "substantially," "about," "essentially," "largely," and other similar terms, are used as terms of approximation and not as terms of degree. As such, these terms are utilized to account for inherent deviations in measured, calculated, and/or provided values and element positioning that would be recognized by one of ordinary skill in the art without departing from the overall spirit and scope of the invention as described. It should also be understood that when an element is referred to as being "connected to," "coupled to," "adjacent to," "adjoining to," "proximal to," "abuts," or "in contact with" another element, for example, the element may be directly touching the other element or one or more intervening elements may be present, adjacent, or proximal. Additionally, elements that are "proximal to" one another may or may not be touching, but are necessarily nearby one another within a contextually reasonable distance.

Likewise, other relative terms, such as "beneath," "below," "over," "underneath," "under," "above," "upper," "lower," and the like, are used herein solely for descriptive purposes, describing elements in relation to one or more other elements depicted in the drawings. Any spatially relative terms in this context are intended to encompass various variations and/or orientations of the elements of the drawings that as understood by those skilled in the art, remain within the intended scope and spirit of the invention. This includes elements that are rotated, oriented, or displaced differently than the elements specifically depicted in the drawings, and such terms should be interpreted accordingly, given a breadth commensurate with the intended spirit and scope of the invention.

Further, the terms "first," "second," etc., may be used herein to describe elements or sub-elements, but no elements or sub-elements should be specifically limited by these terms as the terms are used to distinguish one element or sub-element from other elements or sub-elements. That is, a first element discussed below could be termed a second element without departing from the spirit and scope of the invention as described in the disclosure.

Exemplary embodiments are described herein with reference to the accompanying drawings, which are schematic illustrations of specific examples only. Accordingly, variations from any specific shapes shown, for example, caused by various manufacturing techniques, material properties, tolerances, and variability in workable shapes that will perform the same function are expected to be given their broadest reasonable interpretation. Thus, any components illustrated in the figures are purely exemplar and their shapes are not intended to illustrate the actual shape of an equivalent device or component as disclosed and are not intended to limit the scope of exemplary embodiments.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. The embodiments of the invention will be described below with reference to the drawings. It should be understood that the specific embodiments described herein are merely illustrative of the invention and are not intended to limit the scope of the invention. It will be apparent, however, that one or more embodiments may be practiced without one or more of these specific details. It should also be understood that the details of the figures may be different from those that have been disclosed in words unless explicitly limiting the characteristics in this specification.

Figure 1A:
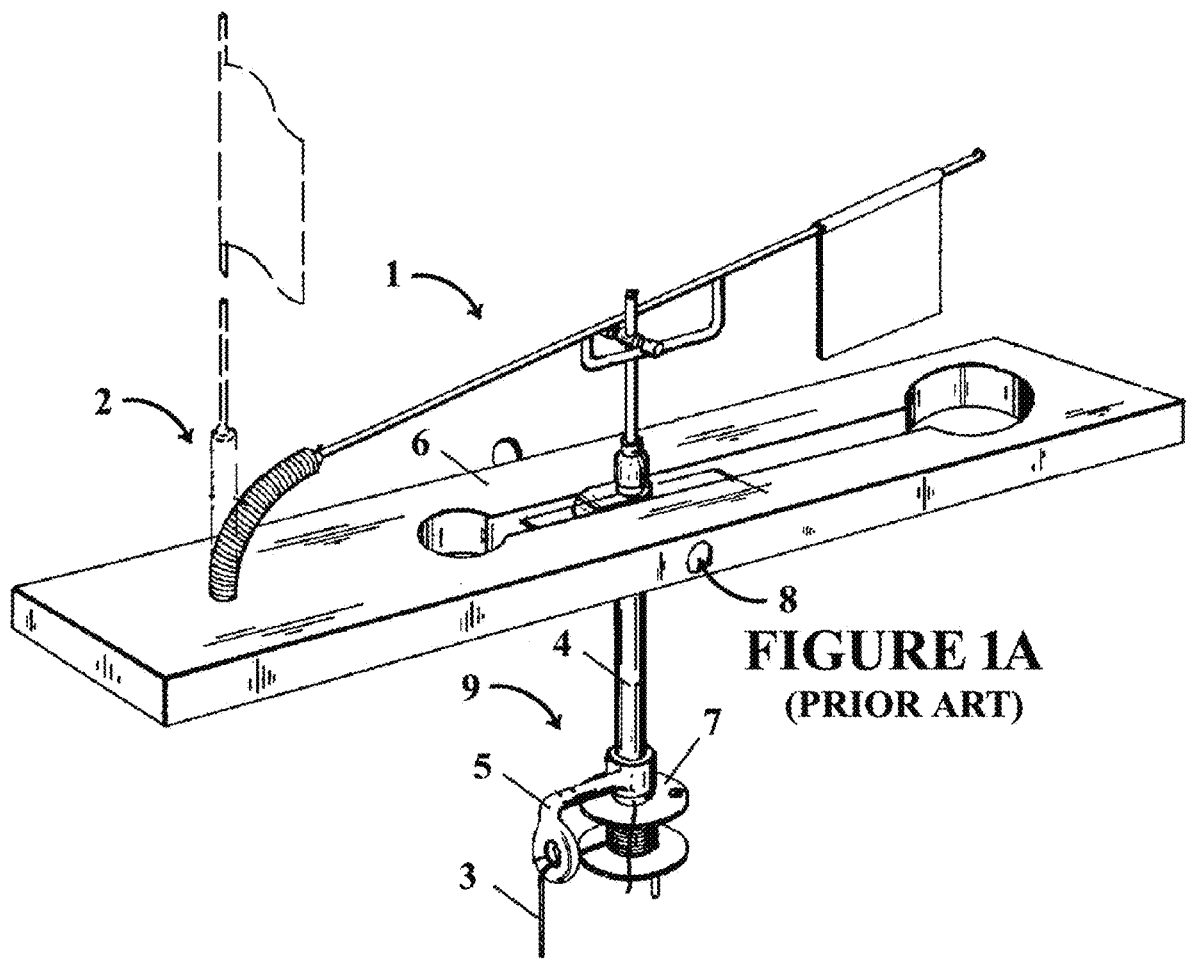
FIGS. 1A-1B are exemplary views of a tip-up fishing device as known in the prior art.
Figure 1B:
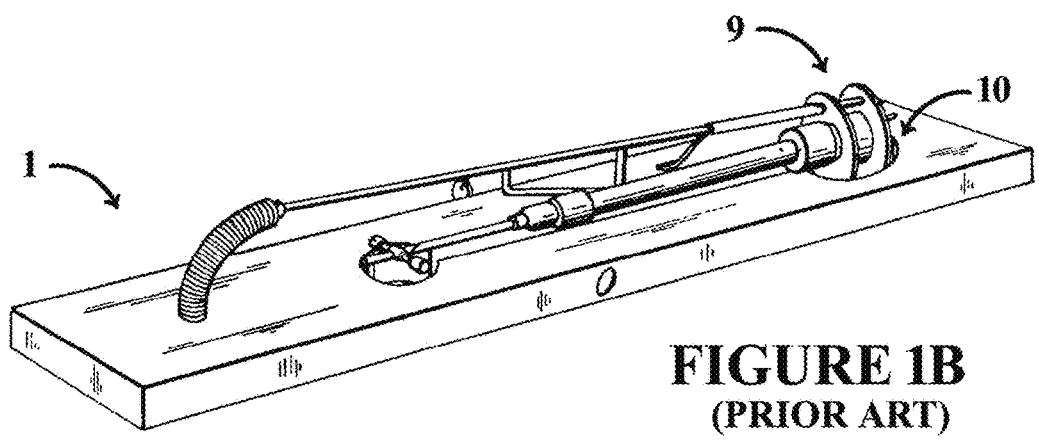

Referring to FIGS. 1A and 1B, a tip-up fishing device 1 as known in the prior art is shown. Additional details of a similar tip-up fishing device 1 may be found in the prior art, including U.S. Pat. No. 2,654,176, by Kachelski et al., patented and published on Oct. 6, 1953. The disclosed tip-up fishing device 1 includes a base 6 having an attached flag assembly 2 that is used to indicate when bait on a hook (not shown) has been disturbed. A bearing tube 4 is connected to a reel assembly 9 that includes a reel 7, a line guide 5, and a fishing line 3. The fishing line 3 is typically securely fastened to the reel 7 (before the fishing line 3 is wound onto the reel 7) and the remaining fishing line 3 passes through a hole in the line guide 5 before attaching a hook (not shown) at the other end of the fishing line 3. The base 6 has a pivot pin 8 that enables the bearing tube 4 to rotate, enabling reeling assembly 9 to fit snugly into an opening 10 within the base 6 to provide a much thinner profile. As shown in FIG. 1B, this is typically how the tip-up fishing device 1 is stored and transported.

Figure 1C:
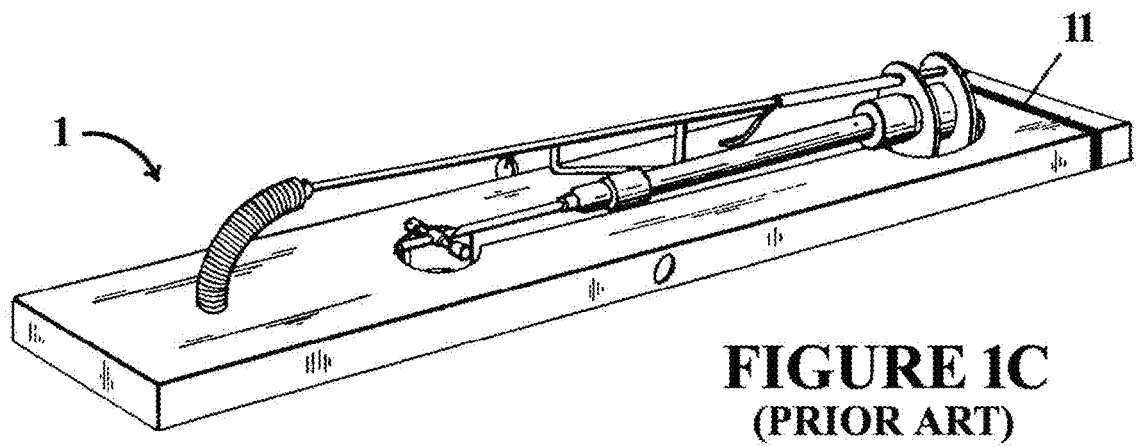
FIGS. 1C-1D are exemplary views of various hook keeper modifications employed with the tip-up fishing device of FIGS. 1A-1B as known in the prior art.
Figure 1D:
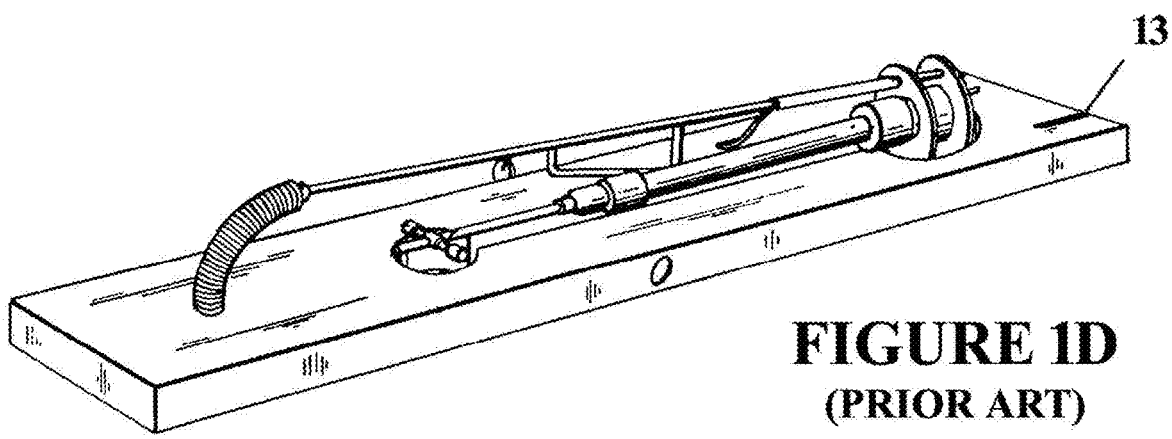

Any hook attached to the fishing line 3 hangs loose and remains at risk of engaging nearby objects including fishing line(s) of its own tip-up fishing device 1 or other fishing devices. As an attempt to address this problem, a number of solutions have been developed in the prior art and remain in current use. Among these, use of a rubber band 11 as depicted in FIG. 1C may be used to engage the hook, but this ad-hoc solution also runs the risk of leaving the hook and hook points and barbs exposed to interact with nearby objects. Further, as depicted in FIG. 1D, a slot 13 may be cut into the tip-up fishing device 1 to enable the fishing line 3 to be guided into the slot 13 and wrapped around the base 6 before the hook is engaged to the fishing line 3, the reel assembly 9, or some other fixed component of the fishing device before being drawn taut to keep the hook in place. These options enable the hook to be reasonably secured but ultimately fail to address the problem of exposed hook points and barbs, particularly when the tip-up fishing device 1 is being stored or transported.

Figure 1E:
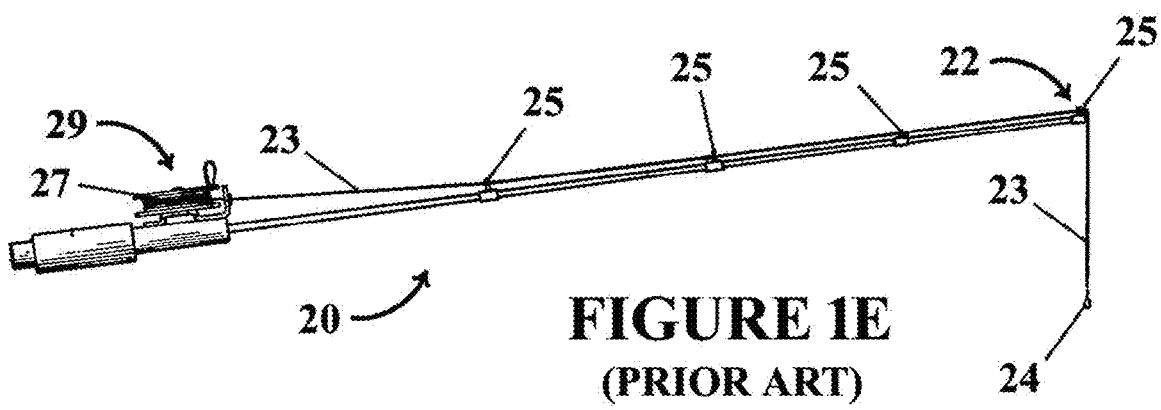
FIG. 1E is an exemplary view of a fishing pole fishing device as known in the prior art.

Referring to FIGS. 1E, a typical fishing rod or fishing pole fishing device 20 as known in the prior art is depicted. The fishing device 20 includes a reel assembly 29 that includes a reel seat at a butt end of the fishing device 20 housing reel assembly 29 having a reel 27 secured to a fishing line 23. The fishing line 23 is wound around the reel 27 and runs through a plurality of line guides 25 along the fishing device 20 to the tip end 22. A fishing hook 24 is typically connected to the other end of the fishing line 23 that extends from the tip end 22.

While storing or transporting fishing device 20, the fishing hook 24 is sometimes attached to some other part of the fishing device 20 being used as a hook keeper, such as one of the line guides 25, the reel assembly 29, the reel 27, or the fishing line 23 itself to immobilize the fishing hook 24 as the line is drawn taut by the reel 27. While this solution may secure the hook reasonably well, it remains at risk of engaging nearby objects including other fishing devices and/or other fishing line(s), loose items of clothing, or even a hand or fingers that come into contact with the points and barbs of the hook. Exposure of the points and barbs of the hook inherently runs a risk of coming into contact and engaging with various nearby objects, potentially causing damage or injury. Further, a fisherman has to handle a fishing hook to place it in a hook keeping position.

A new approach is needed to protect nearby objects from hook points and hook barbs as well as protecting the hooks, points, and barbs themselves when a fishing device is being stored or transported. It is also greatly beneficial for a hook keeper and its use to be highly efficient and quickly employed without significant effort, for example, when ice fishing and handling equipment dripping in ice-cold water in below freezing temperatures. The described invention addresses all of these concerns.

Figure 2A:
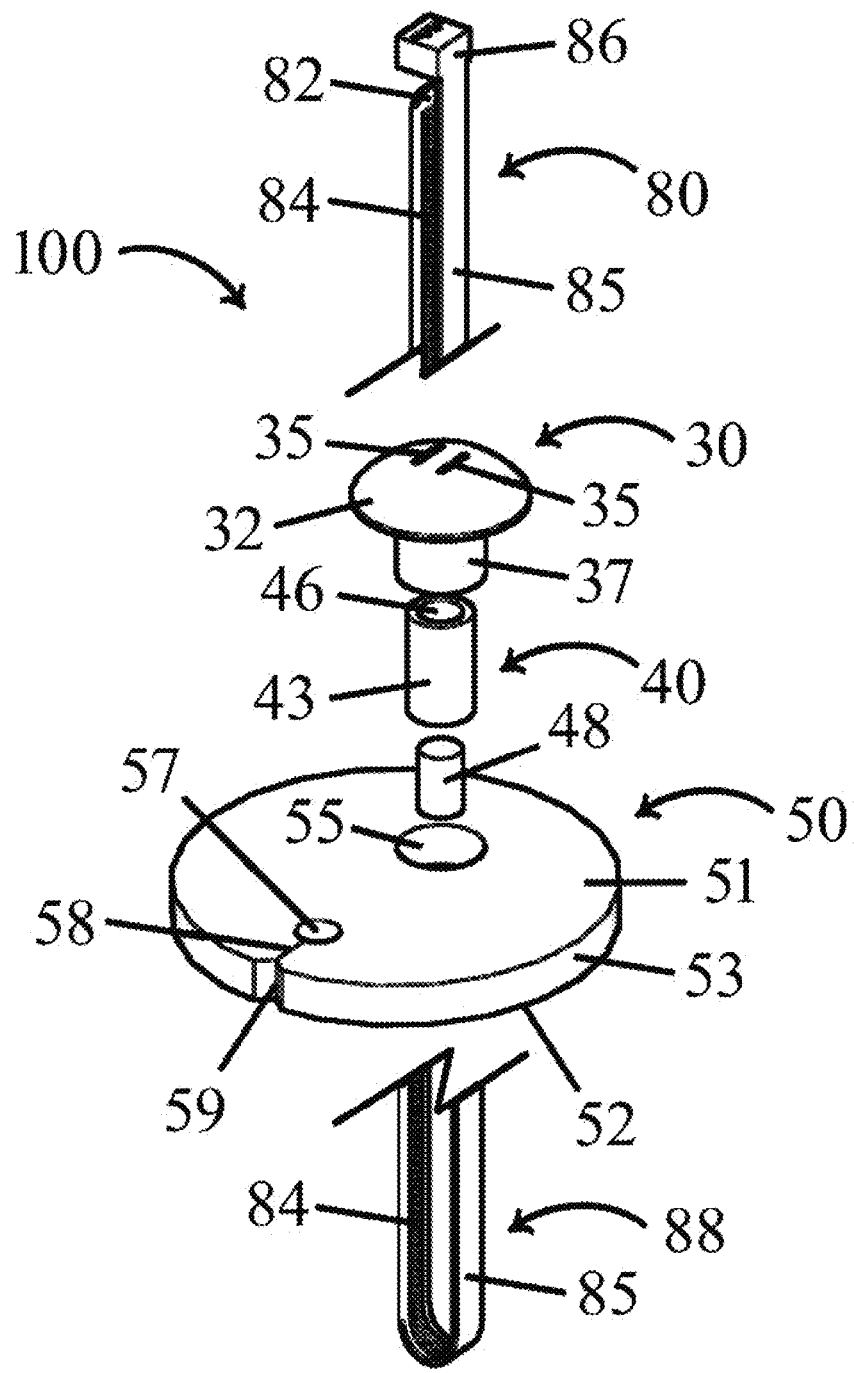
FIGS. 2A-2B are expanded views showing various components of a hook keeper in accordance with one embodiment of the disclosed invention.
Figure 2B:
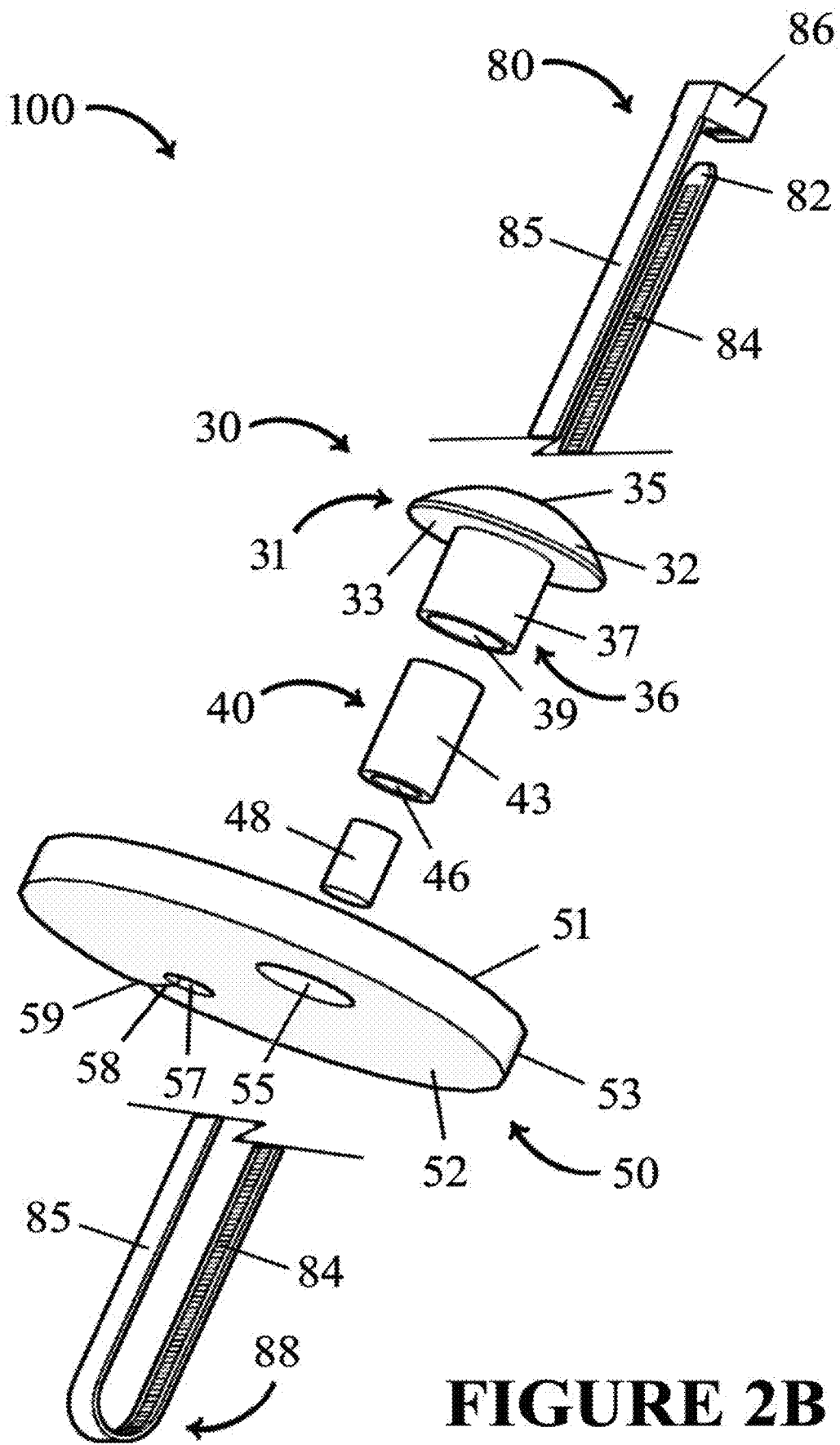

Referring to FIGS. 2A and 2B, a hook keeper 100 is shown having a retaining cap 30, an anchor sleeve 40, a compression plug 48, a hooking pad 50, and a binding wrap 80. The retaining cap 30 has a first portion 31 that includes a domed-shaped head 32 and flat lower surface 33. The domed-shaped head 32 has one or more slots 35 in the first portion 31 that enable a binding wrap 80 to pass through the first portion 32 into a second portion 36 of the retaining cap 30 that includes an outside surface 37 and an opening 39. The second portion 36 may be a cylindrical and hollow pipe that is integrally formed with the first portion 31 to form the retaining cap 30.

In accordance with other embodiments, the first portion 31 may have a different shape than the one depicted, for example, a hexahedron cube, regular or irregular polygonal chamfered or non-chamfered head similar to a machine bolt, include an extended size or flange of the first portion 31 and/or lower surface 33 to increase the diameter of the first portion 31, inclusion of a ring coupled to the first portion 31 to decrease deformation and potential deformation of the retainer cap 30 into a main aperture 55, or a raised ring around the lateral edge of the first portion sitting proud of the lower surface 33 that only contacts the hooking pad 50 at the lateral edge of the first portion 31.

Likewise, the second portion 36 can also be of various shapes, for example, cone-shaped (either/or with a diameter increasing or decreasing along its length), square-shaped, oval, having one or more bevels to accommodate the binding wrap 80, or a design that guides or secures the anchor sleeve 40 in place within.

In accordance with this depicted embodiment, the outer diameter of the second portion 36 is preferably less than the diameter of the first portion 31 and head 32 so that the second portion 36 can extend through the hooking pad 50 while the flat lower surface 33 lays flush with the top surface 51 but stops the retainer cap 30 from passing through the aperture 55. This enables the hooking pad 50 to rotate relative to the retaining cap 30 resisted only by friction between the flat lower surface 33 and the top surface 51 of the hooking pad 50 and the outside surface 37 of the second portion 36 and the interior surface of the main aperture 55 in which the retaining cap 30 is placed while the hook keeper 100 is installed.

Figure 3A:
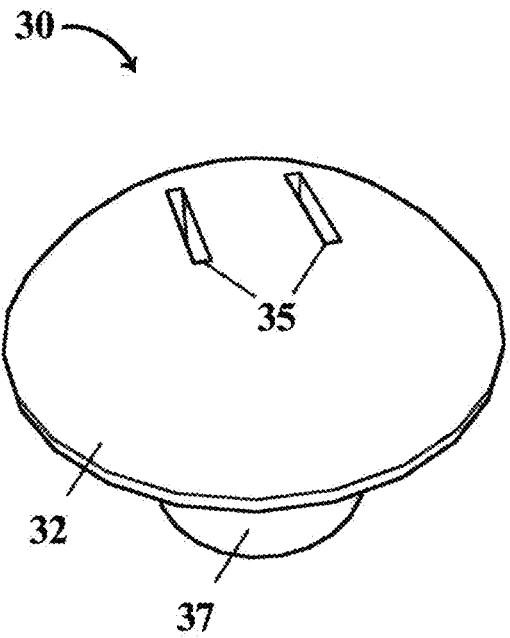
FIGS. 3A and 3B are an exemplary view of a retaining cap implemented in the hook keeper of FIGS. 2A and 2B in accordance with one embodiment of the disclosed invention.
Figure 3B:
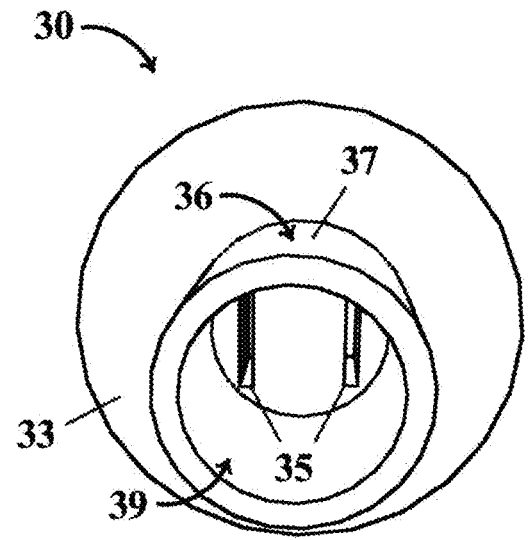

Referring to FIGS. 3A and 3B, a retaining cap 30 is shown in accordance with one embodiment of the disclosed invention. The two main parts of the retaining cap 30, the head 32 of the first portion 31 and the second portion 36 resembling a hollow cylindrical pipe with an opening 39, may be integrally formed or may be formed by two distinct parts or components that are affixed together, and may be made of different materials. In accordance with one embodiment of the invention, the first portion 31 and the second portion 32 are integrally formed. In accordance with another embodiment of the invention, the second portion 36 has a threaded top section that screws into a receiving set of threads in the head 32 (not shown).

In accordance with one embodiment of the invention, the retaining cap 30 and first portion 31 are made of solid and slightly pliable material, but the type of material used as well as the internal design of the first portion 31 is not critical to the function of the component, so there is no requirement for the first portion 31 to be pliable nor internally solid. For example, the first portion 31 and/or the retaining cap 30 as a whole may be 3-D printed having various levels of infill or manufactured by other methods such as injection molding, provided the function and structural integrity of the retaining cap is not compromised. In accordance with yet another embodiment of the invention, all the components form a retaining cap 30 that is completely rigid, fabricated using only non-pliable materials such as metal or polyoxymethylene.

The second portion 36 contains an opening 39 sized to accommodate an anchor sleeve 40 having an exterior surface 43 and a sleeve opening 46. In accordance with one embodiment of the invention, the anchor sleeve 40 abuts the lower surface 33 of the retaining cap 30 inside the opening 39 and has a greater length than the second portion 36 such that the anchor sleeve 40 extends beyond the end of the second portion 36. The portion of the anchor sleeve 40 that stands proud of the second portion 36 will be more apt to deform against a line guide or other attachment surface when compression force is applied, for example, by the binding wrap 80.

The anchor sleeve 40 may be made of pliable material to allow this deformation to take place when compression force is applied, thereby increasing the surface area and friction between the anchor sleeve 40 and the attachment surface to resist movement both linearly along and rotationally around the attachment surface.

In one embodiment, the anchor sleeve 40 is a sleeve of silicone, like silicone tubing. In other embodiments, the anchor sleeve may be part of the retaining cap 30 being integrally formed as part of the retaining cap 30. In another embodiment, the anchor sleeve 40 is omitted altogether and the hook keeper 100 is held firmly in place by a binding wrap 80 securing the retaining cap 30 directly against a line guide such that the hooking pad 50 is positioned to carry out its function and engage with a fishing line and hook points when rotated into place.

In one embodiment, a compression plug 48 may be inserted into the anchor sleeve 40 prior to installation to resist compression and provide additional resistance and force to the anchor sleeve 40 when compression force is applied. This allows the anchor sleeve 40 and compression plug 48 assembly to deform outside the second portion 36 rather than within it. In accordance with one embodiment, the compression plug 48 is shorter in length than the length of the anchor sleeve 40, enabling the compression plug 48 to remain securely fixed in place within anchor sleeve within the second portion 36 while the compression force of the binding wrap 80 deforms the anchor sleeve 40 to keep the compression plug 48 in place while the anchor sleeve 40 extends beyond the edge of the opening 39 of the second portion 36 to engage with an attachment surface.

In one embodiment, the compression plug 48 is made of polyurethane, but the invention should not be limited to any particular material choice. Any suitable material that acts to improve the effects of compression force applied to increase the surface area of the retaining cap 30 or anchor sleeve 40 in contact with a line guide may be used. In other embodiments, wood, metal, and various other plastics are viable options to be used as the compression plug 48.

Figure 3C:
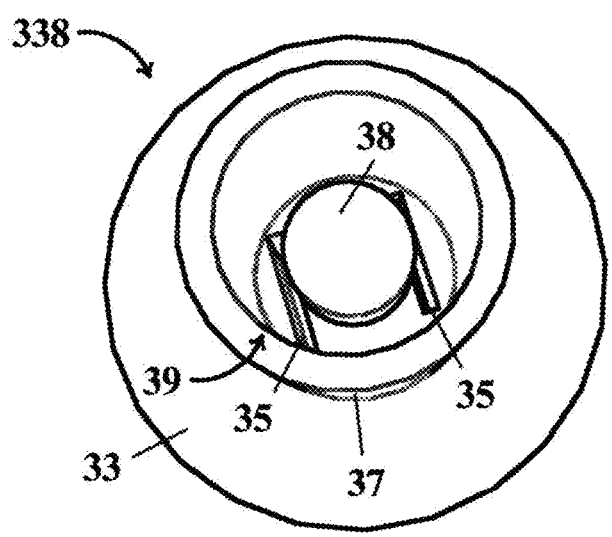
FIG. 3C is an exemplary view of a modified retaining cap in accordance with one embodiment of the disclosed invention.

Referring to FIG. 3C, the compression plug 48 may also be integrally formed as part of the retaining cap 30 or inserted into a recess made in the center of the flat lower surface 33 (not shown). For example, a cylindrical post may be integrally formed as part of the retaining cap 30, positioned on the surface 33 and positioned internal to the second portion 36, central to the opening 39. Further, the compression plug 48 may also be integrally formed as part of the anchor sleeve 40 such that the two components may be inserted into the opening 39 together. In other embodiments, the compression plug 48 may not be used when the structure of the retaining cap 30 or the anchor sleeve 40 is sufficient to firmly hold the retaining cap 30 in place against the line guide. In other embodiments, variation in size and placement of the compression plug 48 can slightly adjust the outer diameter of the outside surface 37 of the second portion 36 of the retaining cap 30 to more securely match with a main aperture 55 of the hooking pad 50. This enables increased friction between the retaining cap 30 and the hooking pad 50 so as to resist movement of the hooking pad 50.

The hooking pad 50 has a first upper surface 51, a second bottom surface 52, an outside lateral edge 53 that runs along the outside edge of the hooking pad 50, a main aperture 55 having a substantially identical diameter as the described second portion 36 outside diameter, a line aperture 57, a slit 58 extending from the first surface 51 to the second surface 52 and from the line aperture 57 to the outside lateral edge of the hooking pad 50, and a notch 59 in the hooking pad 50 that is aligned with the slit 58.

The hooking pad 50 is made of a suitable material that is pliable, durable, and resistant to heat and freezing temperatures. This enables the hooking pad 50 to reasonably bend and flex while maintaining enough strength to resist deformation and puncturing for suitable engagement with hook points having a variety of thicknesses. The materials and thickness of the hooking pad 50 is also variable provided that its overall functionality is not compromised. For example, a silicone, neoprene, Viton™, cloth-inserted reinforced, nitrile, urethane, polyurethane, gum, ethylene propylene diene monomer (EPDM), or foam/sponge rubber pad or sheet may be employed to form the hooking pad 50. In accordance with one embodiment, this material preferably has a Shore durometer hardness in the range of 30 A to 100 A. For example, the material may have a Shore durometer/hardness within this viable range to accommodate its function at a thickness of ⅛ inch. Likewise, the material, shape, dimensions, properties, and features of the hooking pad 50 are highly variable and the generalized shape and form depicted in the figures should not be specifically limiting to the invention. In accordance with one embodiment of the disclosure, the main aperture 55 is larger than the line aperture 57. In accordance with another embodiment, the main aperture 55 and the line aperture 57 are the same size. In yet another embodiment of this disclosure, the main aperture 55 is smaller than the line aperture 57. While the figures depict a substantially circular hooking pad 50, various other shapes may be better in particular applications, such as a tear-shaped hooking pad or a cone-shaped hooking pad having a main aperture 55 and a line aperture 57 off center of the hooking pad 50. Further, orientation of the slit 58 should not be held as limiting for the invention as described.

In accordance with one embodiment, the retaining cap 30, anchor sleeve 40, and compression plug 48, after assembly, are inserted into the main aperture 55. Even though the outer diameter of the second portion 36 of the retaining cap 30 has a substantially equal diameter of the main aperture 55, the hooking pad 50 should be able to rotate about the retaining cap 30 and second portion 36 along an axis of rotation centered on the retaining cap 30, the second portion 36, the anchor sleeve 40, the compression plug 48, and the main aperture 55.

The binding wrap 80 has a wrap end 82, a wrap tread 84, a wrap exterior 85, and a wrap clasp assembly 86. In accordance with one embodiment, the binding wrap 80 is a cable tie, hose tie, tie wrap, wire tie, zap-strap, or zip tie, typically made of nylon having a flexible tape section with teeth of the wrap tread 84 engaging with a pawl (not shown) in the wrap clasp assembly 86 to form a ratchet such that the wrap end 82 of the tape section can be pulled to tighten the binding wrap 80 and remain firmly in place.

The wrap end 82 of the binding wrap 80 is inserted into the one or more slots 35 in the first portion 31 of the retaining cap 30 and fed into the second portion 36 of the retaining cap 30. The wrap end 82 is then inverted to form a wrap fastening end loop 88 before being inserted back into the second portion 36 of the retaining cap 30 and the wrap end 82 is inserted into the one or more slots 35 of the first portion 31 of the retaining cap 30 from below. This places the wrap exterior 85 of both sections of the binding wrap 80 inside the second portion 36 proximal to the inside surface of the opening 39.

The compression plug 48 is inserted into the anchor sleeve opening 46 and the anchor sleeve 40 is positioned between the two sections of the binding wrap 80 inside the second portion 36 of the retaining cap 30. The wrap fastening end loop 88 is inserted through the main aperture 55 and the retaining cap 30 is placed into the main aperture 55 of the hooking pad 50 until the flat lower surface 33 of the retaining cap 30 is flush with the hooking pad 50.

Figure 4A:
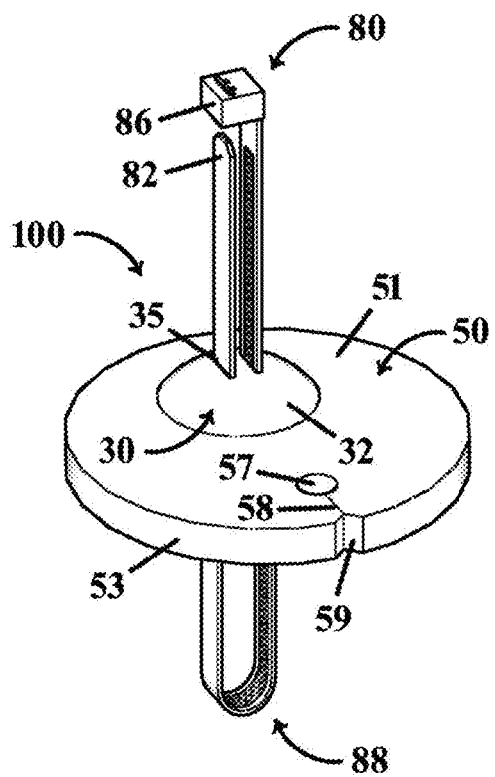
FIGS. 4A and 4B are exemplary views of an assembled hook keeper ready for installation in accordance with one embodiment of the disclosed invention.
Figure 4B:
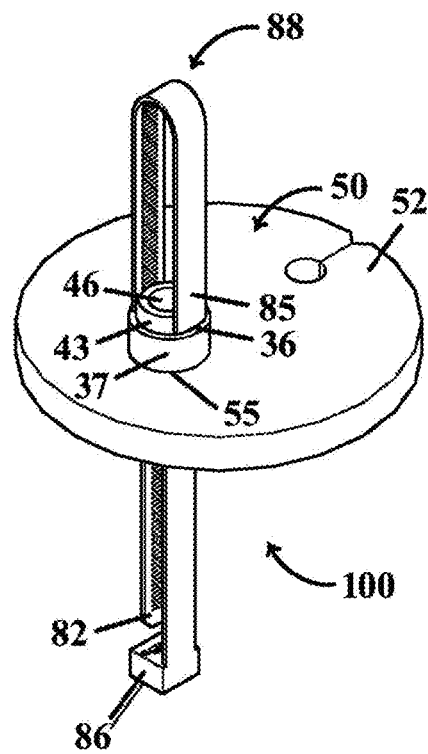

Referring to FIGS. 4A and 4B, the result of this process is depicted in accordance with one embodiment of the invention. The hook keeper 100 includes a hooking pad 50 having a first surface 51, a second surface 52, a main aperture 55, a line aperture 57, and a slit 58 extending from the first surface 51 to the second surface 52 and from the line aperture 57 to an outside lateral edge 53 of the hooking pad 50. A retaining cap 30 has a first portion 31 with a diameter larger than the main aperture 55 and is positioned flush with the first surface 51, at least one slot 35 in the first portion 31, and a second portion 36 having outside surface 37 with substantially the same diameter positioned inside the main aperture 55. An anchor sleeve 40 is positioned in the second portion 36 of the retaining cap 30 extending beyond the second surface 52 of the hooking pad. The anchor sleeve 40 surrounds a compression plug 48 (not shown) positioned in the interior. A binding wrap 80 is positioned on opposite sides of the anchor sleeve 40 and passing through the at least one slot 35 of the retaining cap 30.

The wrap end 82 remains clear of the wrap clasp assembly 86 and a wrap fastening end loop 88 provides a confined space that may be wrapped around a component of a fishing device, such as a line guide or tip end. The retainer cap 30 sits flush with the first surface 51 of the hooking pad 50 securely inside the main aperture 55. In accordance with this embodiment, the dome-shaped head 32 of the retainer cap 30 has two slits 35 which the binding wrap 80 has been inserted through, positioned between the inside surface of the second portion 36 in opening 39 and the exterior surface 43 of the anchor sleeve 40. The compression plug 48 (not shown) is positioned inside the anchor sleeve 40 in the opening 46. The hook keeper 100 is now ready for installation.

Figure 5A:
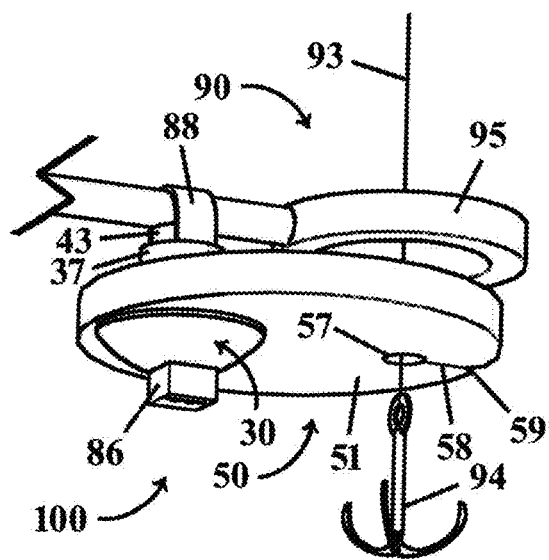
FIGS. 5A and 5B are exemplary views of an installed hook keeper installed on a fishing device line guide in accordance with one embodiment of the disclosed invention.
Figure 5B:
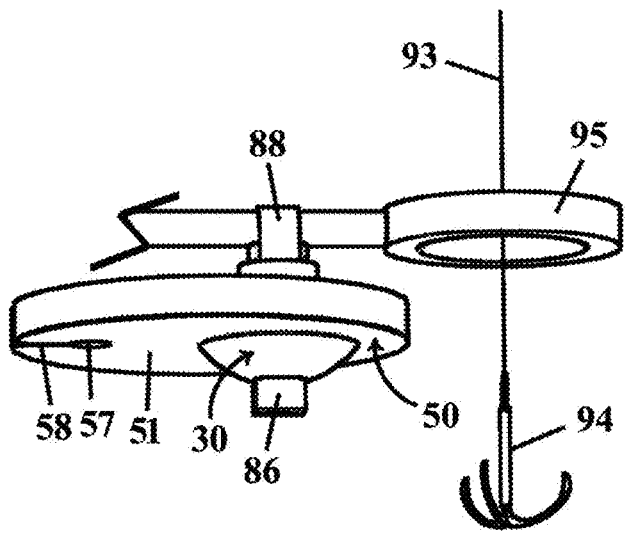

Referring to FIGS. 5A and 5B, the hook keeper 100 is shown after installation on a line guide 95 of a fishing device (not shown) in accordance with one embodiment of the invention. The wrap fastening end loop 88 is tightened against the line guide 95 by inserting the wrap end 82 into the wrap clasp assembly 86 and constricting the binding wrap 80 firmly to secure the anchor sleeve 43 against the line guide 95 with compression force potentially causing the anchor sleeve 43 to deform against the line guide 95. In accordance with other embodiments of the invention, the retainer cap 30 contacts the line guide 95 directly. The wrap clasp assembly 86 contains a pawl (not shown) that engages with one or more teeth of the wrap tread 84 to secure the binding wrap 80 in place. In accordance with one embodiment of the invention, the retainer cap 30 sits flush against the first surface 51 of the hooking pad 50 and any excess of the wrap end 82 is removed, for example, by cutting via tool or wrap end 82 perforation.

Dependent upon any required clearances and applied force used to tighten the binding wrap 80, the second portion 36 of the retaining cap 30 is proximal to the line guide 95, but is not in contact with the line guide 95. In accordance with another embodiment, more force may be used to tighten the binding wrap 80 and deform the anchor sleeve 40 further such that the second portion 36 of the retainer cap 30 comes into contact with the line guide 95. Additionally, in accordance with other embodiments of the invention, minor distinctions in the structure and/or shape of the line guide 95, the retainer cap 30, and/or the anchor sleeve 40 may be different or adjusted for contact between the retainer cap 30 and the line guide 95 installation region.

In accordance with one embodiment of the invention depicted in FIG. 5A, when the hooking pad 50 is rotated such that the line aperture 57 is aligned with the hole of the line guide 95 (as shown), the fishing line 93 may be displaced into the line aperture 57 via slit 58 using the notch 59 as a guide such that an attached fishing hook 94 becomes aligned with the hooking pad 50 enabling the shank of the fishing hook 94 to enter the line aperture 57 when the fishing line 94 is tightened, for example, by using a reel of the fishing device, such as reel 7 or reel 27. When this occurs, the points of the fishing hook 94 will engage with the first surface 51 of the hooking pad 50 while the line is taut and secure the fishing hook 94 in place.

When it is desired to displace or remove the fishing hook 94 from the hooking pad 50, the line merely has to be loosened, again, using a reel of the fishing device in accordance with one embodiment. This allows the fishing line 93 and attached fishing hook 94 to move freely away from the first surface 51 of the hooking pad 50. As depicted in FIG. 5B, the hooking pad 50 can be rotated so as not to obstruct the hole of the line guide 95 in any way such that the fishing line 93 and the hook 94 do not interact with the hook keeper 100 when the fishing device is in use.

While the fishing hook 94 is depicted as a treble hook having three hook points with a consistent hook gap, the hook keeper 100 may accommodate any type of hook or composite hook with a plurality of hook points that interact with the hooking pad 50. Some examples include a hook with a single shank and a single point, a single shank and two hook points, or a single shank and three hook points, as shown. In accordance with various other embodiments of the invention, the hooking pad 50 may be modified in size and/or shape to accommodate any number of hooks, shanks, and hook points provided the hook shank(s) can freely enter the line aperture 57 and a gap between the shank and hook points enable the hook points to engage with the hooking pad 50 to secure the hook.

Figure 6A:
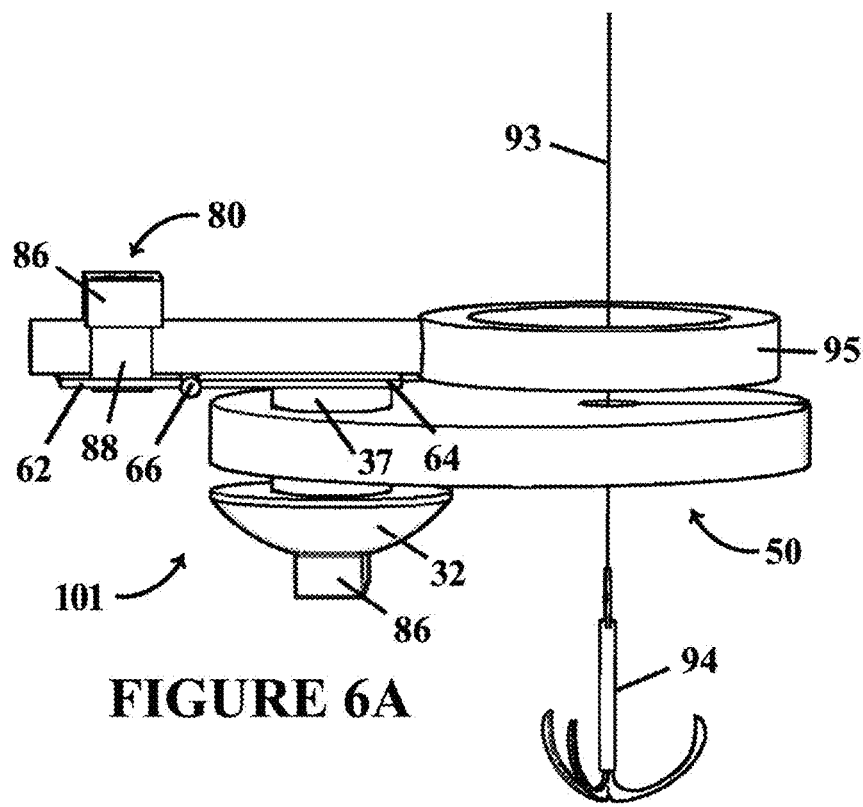
FIGS. 6A and 6B are exemplary views of an installed hook keeper installed on a fishing device line guide in accordance with one embodiment of the disclosed invention.
Figure 6B:
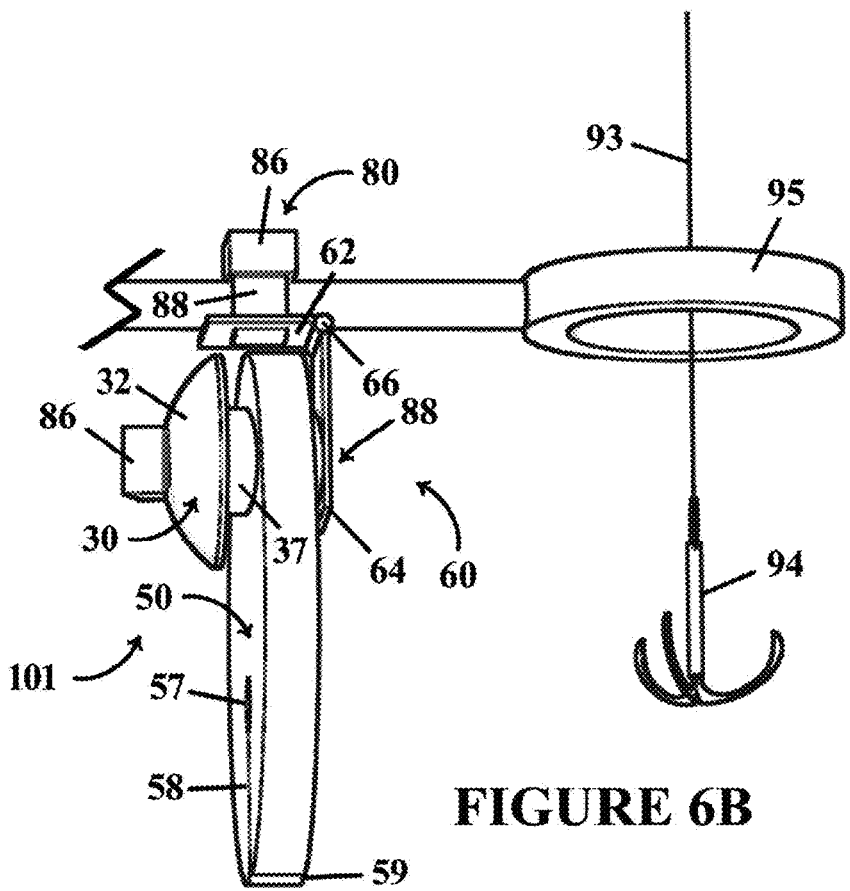

Referring to FIGS. 6A and 6B, a hook keeper 101 is depicted in accordance with another embodiment of the invention. Similar to other embodiments, the hook keeper 101 is secured to a line guide 95 by a binding wrap 80.

The hook keeper 101 includes a hinge assembly 60 that has a first hinge part 62, a second hinge part 64, and a hinge pivot pin 66. The hinge pivot pin 66 connects the first hinge part 62 and the second hinge part 64, enabling the first hinge part 62 and the second hinge part 64 to rotate relative to each other about the rotational axis of the pivot pin 66.

In accordance with other embodiments of the invention, the hinge assembly 60 may be part of the hooking pad itself, for example, a perforation, thinner section of the hooking pad, or other rotational element(s) that enable the hooking pad to be in a first position that obstructs a hole of the line guide 95 and a second position that does not obstruct the hole of the line guide 95. Various other types of rotational mechanisms and hinge assemblies are within the scope of the invention and the specific hinge assembly 60 shown here and its bindings to other components of a hook keeper should not be held to be specifically limiting.

In this embodiment, a binding wrap 80 secures the first hinge part 62 to the line guide 95. The first hinge part 62 has one or more slits (not shown) that enable the binding wrap 80 to secure the hinge assembly 60 firmly to the line guide 95. The tightness of the binding wrap 80 and friction between the hinge assembly 60 and the line guide 95 may be adjusted to prevent movement along the line guide 95 and/or rotation around the line guide 95 shaft altogether, or allow movement and rotation when the fisherman desires, for example, to align the hook keeper 100 or displace it further out of the way of the hole of the line guide or other fishing device components.

The second hinge part 64 also has one or more slits (not shown) that enable a second binding wrap 80 to secure the retaining cap 30 to the second hinge part 64. During assembly of the hook keeper 101 depicted in accordance with this embodiment, the second portion 37 of the retaining cap 30 is inserted into a main aperture 55 of the hooking pad 50 before the retaining cap 30 is secured to the second hinge part 64. As detailed prior, the wrap end 82 of the binding wrap 80 is fed through the wrap clasp 86, tightened firmly, and any remainder of the wrap end 82 is removed to avoid interaction with other things or components.

The hinge pivot pin 66 enables the retaining cap 30 and hooking pad 50 to rotate such that the line aperture 57 aligned with the hole of the line guide 95 as shown in FIG. 6A, where the fishing line 93 may be displaced into the line aperture 57 via slit 58 using the notch 59 as a guide such that an attached fishing hook 94 becomes aligned to enter the line aperture 57 when the fishing line 94 is tightened.

The hinge pivot pin 66 also enables the retaining cap 30 and hooking pad 50 to rotate such that the line aperture 57 does not obstruct the hole of the line guide 95, enabling the fishing line 93 and attached fishing hook 94 to move freely away from the hooking pad 50. As depicted in FIG. 6B, the hinge assembly 60 allows rotation to displace the hooking pad 50 such that the hooking pad 50 does not obstruct the hole of the line guide 95. In this way, the fishing line 93 and the hook 94 passing through the line guide 95 do not interact with the hook keeper 101 when the fishing device is in use.

Figure 7:
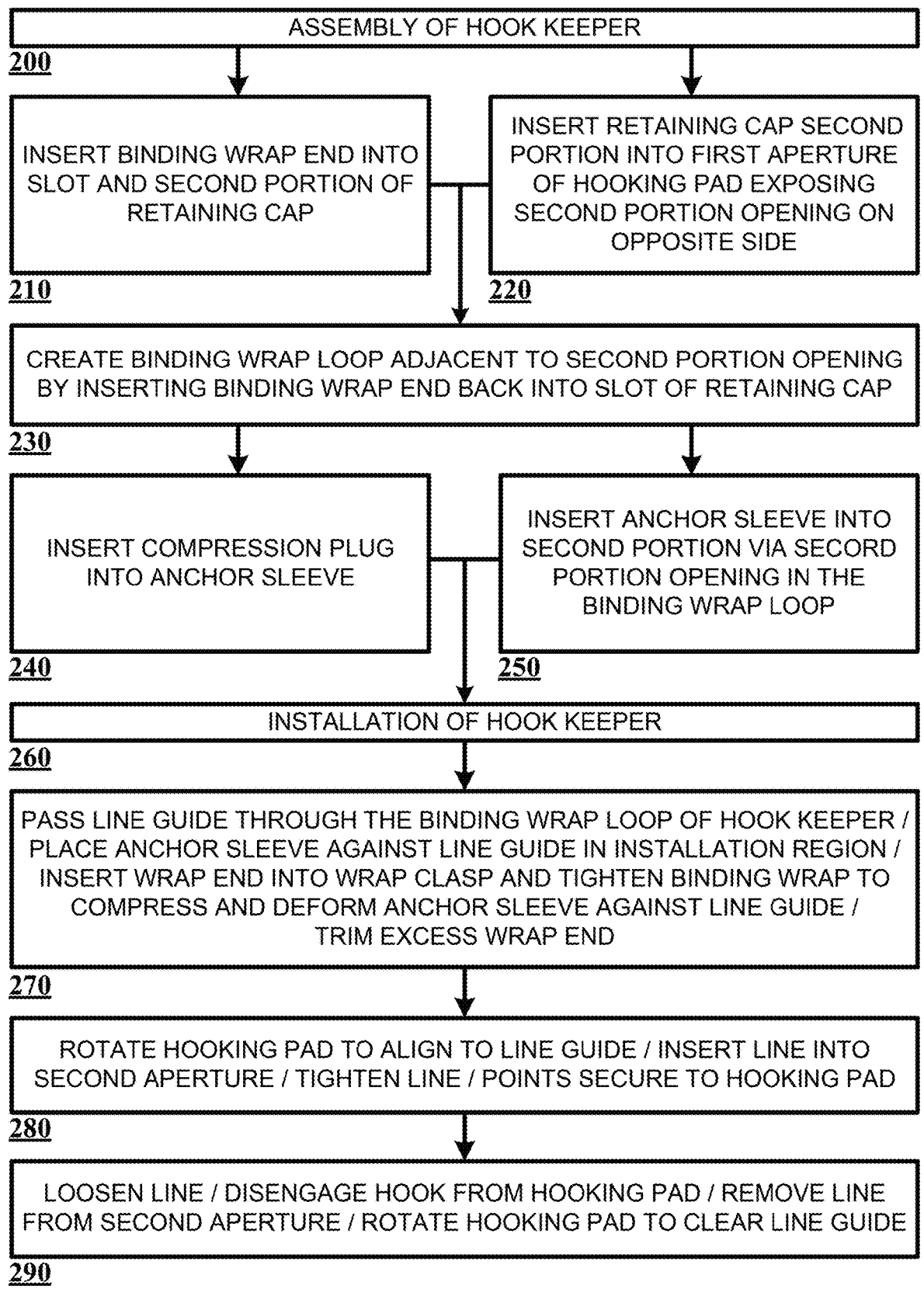
FIG. 7 is a flowchart of a method employed to assemble and install a hook keeper on a fishing device in accordance with one embodiment of the disclosed invention.

Referring to FIG. 7, a flowchart for a process for hook keeper assembly 200 and hook keeper installation 260 are described in accordance with one embodiment of the invention. Other methods for assembling the hook keeper 100 are also possible and this example should not be held to be specifically limiting.

In step 200, assembly of a hook keeper 100 begins by collecting all the required components for assembly of the hook keeper 100. In this embodiment, these components include a retaining cap 30, an anchor sleeve 40, a compression plug 48, a hooking pad 50, and a binding wrap 80. Other methods may be employed to assemble and/or install other embodiments of the described invention in accordance with these other embodiments, dependent upon the components and requirements of these embodiments.

Steps 210 and 220 may occur in any order, but both are suggested in accordance with this embodiment.

In step 210, the binding wrap end 82 of the binding wrap 80 is inserted into the one or more slots 35 of the retaining cap 30 and fed into the second portion 36 of the retaining cap 30. It is not recommended to pull the entire binding wrap 80 such that the wrap clasp assembly 86 becomes flush with the retainer cap 30, since the wrap end 20 must be fed into the wrap clasp assembly 86 during installation.

In step 220, the second portion 36 of the retaining cap 30 is inserted into the main aperture 55 of the hooking pad 50. The flat lower surface 33 of the retaining cap 30 is positioned flush with the first surface 51 of the hooking pad 50. A small portion of the exterior surface 37 of the second portion 36 may be exposed to be proud of the second surface 52 of the hooking pad 50, exposing the second portion opening 39.

In step 230, the binding wrap 80 is used to create a wrap fastening end loop 88 adjacent to the second portion opening 39 by inverting the wrap end 82 and inserting the wrap end 82 back into a slot 35 of the retaining cap 30.

Steps 240 and 250 may occur in any order, but both are suggested in accordance with this embodiment.

In step 240, the compression plug 48 is placed within the opening 46 of the anchor sleeve 40. The compression plug 48 may or may not be placed against the flat surface 33 of the cap 32 internal to the second portion 36 of the retaining cap 30. In accordance with other embodiments, such as the embodiment depicted in FIG. 3C, this step may not be necessary, or an equivalent insertion of the compression plug 48 into the anchor sleeve 40 by placement of the anchor sleeve 40 onto said compression plug 48 may take place in conjunction with step 250.

In step 250, the anchor sleeve 40 is inserted into the sleeve opening 39 of the second portion 36 of the retaining cap 30, inside the wrap fastening end loop 88. The anchor sleeve 40 should be positioned between the two portions of the binding wrap 80 that pass through the one or more slits 35 of the first portion 31 of the retaining cap 30. The fitting should be reasonably snug, given that in accordance with this embodiment, the outer diameter of the anchor sleeve 30 is substantially identical to the inner diameter of the second portion sleeve opening 39 and the inserted compression plug 48 is effectively unable to compress and deform.

In this state, assembly of the hook keeper 100 is complete and is now ready to be installed. The hook keeper 100 ready to be installed is depicted in FIGS. 4A and 4B.

In accordance with one embodiment of the invention, an installation region is identified and the wrap fastening end loop 88 is positioned such that, when tightened by inserting the wrap end 82 into the wrap clasp assembly 86 and pulling on the wrap end 82, the wrap fastening end loop 88 restricts and holds the hook keeper 100 in place by compression force.

Installation of the hook keeper 100 begins in step 260. Other methods for installing the hook keeper 100 are also possible and this example should not be held to be specifically limiting.

In step 270, a line guide 95 is passed through the wrap fastening end loop 88 of the hook keeper 100 and the anchor sleeve 40 of the hook keeper 100 is placed against line guide 95 at an installation region. The hook keeper 100 is rotated about the line guide 95 such that the hook keeper 100 is oriented to enable the hooking pad 50 to rotate to at least two positions, a first position where the hooking pad 50 does not obstruct any fishing line 93 of the fishing device running through the line guide 95 and a second position where the line aperture 57 is aligned with the hole of the line guide 95. Once in position, the anchor sleeve 40 is put into contact with the line guide 95 and the wrap end 82 is inserted into wrap clasp assembly 86 such that teeth of the wrap tread 84 of the binding wrap 80 engage with a pawl (not shown) interior to the wrap clasp assembly 86. The binding wrap 80 is tightened by pulling on the wrap end 82 until the anchor sleeve 40 is compressed against the installation region of the line guide 95, deforming the anchor sleeve to increase surface area for friction. Once tightened, any excess and unneeded wrap end 82 is removed, for example, using a tool to cut the wrap end 82 or breaking off the wrap end 82 via a preformed perforation of the binding wrap 80.

At this stage, the hook keeper 100 has been installed and is ready for use. As mentioned, the hooking pad 50 rotates about the outside surface 37 of the second portion 36 of the retainer cap 30 as the retainer cap 30, anchor sleeve 40, and binding wrap 80 remain in bound a fixed position. Some additional friction may be induced by the flat lower surface 33 of the retainer cap 30 against the hooking pad 50, but once installed, the hooking pad 50 is free to move slightly along the second portion 36 of the retainer cap 30 between the hooking pad 50 and the line guide 95. The binding wrap 80 is designed to perform sufficient compression and/or deforming of the anchor sleeve 40 against the line guide 95 to result in preventing the hooking pad 50 from disengaging with the second portion 36 of the retainer cap 30.

In accordance with one embodiment of the invention, use of the hook keeper 100 installed on a fishing device involves the following. Other methods for using the hook keeper 100 are also possible and this example should not be held to be specifically limiting.

In step 280, when the fishing device is being stored or transported, the hooking pad 50 is rotated about the second portion 36 of the retaining cap 30 to align to the line aperture 57 of the hooking pad 50 with a hole of the line guide 95. Fishing line 93 of the fishing device may be shifted into the line aperture 57 via slit 58, possibly using notch 59 as a guide to direct the fishing line 93 into the slit 58.

Once the fishing line 93 is positioned inside the line aperture 57, the fishing line 93 is wound or drawn, for example using a reel 7, 27, or manually tightened by hand to restrict the fishing line 93 so as to pull the hook 94 attached to the end of the fishing line 93 toward the hooking pad 50. Being careful not to overtighten the fishing line 93 so as to break it, the hook 94 held in place by friction of the hook points against the hooking pad 50 may be securely fixed to the hooking pad 50 for safe storage and transport of the fishing device.

In step 290, when the fishing device is no longer being stored or transported and there is a desire to use the fishing device for fishing, the fishing line 93 is loosened to provide some slack in the line, for example, using a reel 5, 27 of the fishing device to unwind some of the coiled and wound fishing line 93 of the fishing device. Once loosened, the point(s) of the hook 94 detach from the hooking pad 50 and may be pulled away from the hooking pad 50 with ease. This may include displacing the shank of the hook 94 from the line aperture 57, detaching any points or barbs which may have engaged the hooking pad 50, or simply sliding the bend(s) or point(s) of the hook(s) along the hooking pad 50 until they are clear. The fishing line is then fed through the slit 58 so that it is also free of the hooking pad 50 completely. The hooking pad 50 is now rotated about the second portion 36 so that it is completely clear from any obstruction or interference with the hole of the line guide 95, shank of the hook 94, and fishing line 93.

Dependent upon the type of fishing device the hook keeper 100 is installed upon, various locations may be available as suitable installation regions. In some embodiments, hook keeper 100 is suitable to attach proximal to a final line guide 5, 25, 95 of a fishing device, for example, at a tip end of a fishing rod or a single line guide of a tip-up fishing device. The hook keeper 100 enables a line-attached hook to be safely secured directly to the fishing device proximal to a line guide at the hooking pad 50 when reeling in and tightening the line of the fishing device. The hook keeper 100 also helps to guide the line (much like a line guide does) such that the hook can directly engage with the hooking pad 50 when rotated and placed into position, both containing incoming fishing line being reeled or wound and also physically engaging with the shank(s), bend(s), and/or point(s) of the hook to keep it stationary and secure during transport or storage of the fishing device. This obviates the recreational or professional fisherman from any fear or risk of hook point or barb interaction which can cause injury or damage. Lastly, the hook keeper is immensely efficient, providing a hook securing solution in mere seconds, rather than struggling to find exactly where to attach a hook on a fishing device, like a looped or winded fishing line or distant line guide. A fisherman using tip-up fishing devices to conduct ice fishing know that every second counts when your fingers, clothes, and equipment are cold and wet at the end of a fishing session in freezing temperatures. The disclosed hook keeper provides a quick and easy solution to safely securing fishing hooks using these devices while alleviating all fears that the hooks are not sufficiently isolated to protect your hands, equipment, clothing, other fishing devices, and children during storage or transport of the fishing devices.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly in accordance with the present disclosure.

With respect to the above description, it is recognized that dimensional relationships for the parts of the disclosure, including variations in size, materials, shape, form, function and manner of operation, and assembly and use, are deemed readily apparent to those skilled in the art, and all equivalent relationships to those illustrated in the drawings and described in the specification are intended to be encompassed by the present disclosure.

The invention claimed is:

1. A hook keeper for securing a hook attached to a fishing line passing through a line guide of a fishing device, the hook keeper comprising:
    a hooking pad connected to the line guide, the hooking pad configured to rotate into a first position allowing the fishing line to pass through a first aperture of the hooking pad unimpeded, and a second position where the fishing line does not contact or pass through the hooking pad; and
    a binding wrap fastening the hook keeper to the line guide.

2. The hook keeper of claim 1, wherein the hook keeper further comprises:
    a retaining cap, having a first portion, a second portion, and at least one slot in the first portion;
    wherein the binding wrap passes through the at least one slot of the retaining cap;
    wherein the second portion is positioned inside a second aperture of the hooking pad.

3. The hook keeper of claim 2, wherein the hook keeper further comprises:
    an anchor sleeve positioned in the second portion of the retaining cap; and
    a compression plug positioned inside the anchor sleeve.

4. The hook keeper of claim 3, wherein the binding wrap is positioned between the hooking pad and the anchor sleeve.

5. The hook keeper of claim 2, wherein the hooking pad rotates about the second portion of the retaining cap.

6. The hook keeper of claim 2, wherein the retaining cap sits flush against the hooking pad.

7. The hook keeper of claim 1, wherein the hooking pad includes a first surface facing the line guide in the first position, a second surface opposite the first surface, and a slit extending from the first surface to the second surface and from the first aperture to an outside lateral edge of the hooking pad.

8. The hook keeper of claim 1, wherein the hooking pad rotates in a plane parallel to a plane of a hole of the line guide.

9. The hook keeper of claim 1, wherein the hooking pad rotates perpendicular to a plane of a hole of the line guide.

10. The hook keeper of claim 1, wherein the fishing device is a tip up fishing device.

11. A hook keeper for securing a hook attached to a fishing line passing through a line guide of a fishing device, the hook keeper comprising:
    a hooking pad having a first surface, a second surface, a first aperture, a second aperture, and a slit extending from the first surface to the second surface and from the second aperture to an outside lateral edge of the hooking pad;
    a retaining cap having a first portion positioned substantially flush with and against the first surface, at least one slot in the first portion, and a second portion positioned inside the first aperture; and
    a binding wrap passing through the at least one slot of the retaining cap and securing the hook keeper to the line guide.

12. The hook keeper of claim 11, further comprising:
    an anchor sleeve positioned in the second portion of the retaining cap; and
    a compression plug positioned inside the anchor sleeve;
    wherein the binding wrap is positioned inside the second portion on opposite sides of the anchor sleeve;
    wherein the retaining cap extends to at least the edge of the second surface of the hooking pad.

13. The hook keeper of claim 12, wherein the binding wrap compresses and deforms the anchor sleeve to secure the hook keeper to the line guide.

14. The hook keeper of claim 11, wherein the hooking pad rotates about the second portion of the retaining cap in a plane parallel to a hole of the line guide.

15. The hook keeper of claim 11, wherein the slit of the hooking pad expands to allow the fishing line of the fishing device to pass through the edge of the hooking pad and be positioned inside the second aperture of the hooking pad.

16. The hook keeper of claim 11, wherein the second aperture accommodates a shank of the hook attached to the fishing line of the fishing device and the hooking pad engages with at least one point of the hook when the fishing line is taut.

17. The hook keeper of claim 16, wherein the at least one point comprises a plurality of points engaging with the hooking pad.

18. A method for installing and using a hook keeper in conjunction with a fishing device, the method comprising the steps of:
    placing the hook keeper against an installation region of a line guide of the fishing device; and
    tightening a binding wrap of the hook keeper to install and secure the hook keeper against the line guide at the installation region;
    wherein a hooking pad of the hook keeper is configured to rotate to a first position to surround a fishing line of the fishing device and engage at least one point of a hook attached the to hook when the fishing line is taut;
    wherein the hooking pad of the hook keeper is configured to rotate to a second position such that the fishing line and hook are clear from interaction with the hook keeper.

19. A method for installing and using a hook keeper in conjunction with a fishing device of claim 18, wherein when the hook keeper is in the first position, the method further comprises:
    aligning an aperture of the hooking pad with a hole of the line guide;
    positioning the fishing line of the fishing device inside an aperture of the hooking pad via a slit to surround the fishing line; and tautening the fishing line of the fishing device to draw a shank of the hook of the fishing device into the aperture of the hooking pad, and engage the at least one point of the hook with the hooking pad to immobilize the hook.

20. A method for installing and using a hook keeper in conjunction with a fishing device of claim 18, wherein when the hook keeper is in the first position, the method further comprises:

loosening the fishing line of the fishing device to disengage the at least one points of the hook from the hooking pad;

removing the fishing line from the aperture of the hooking pad via the slit; and rotating the hooking pad into the second position.

* * * * *